Dec. 17, 1935.  J. H. HUMBERSTONE  2,024,164
ARC WELDING ELECTRODE
Filed Oct. 26, 1934
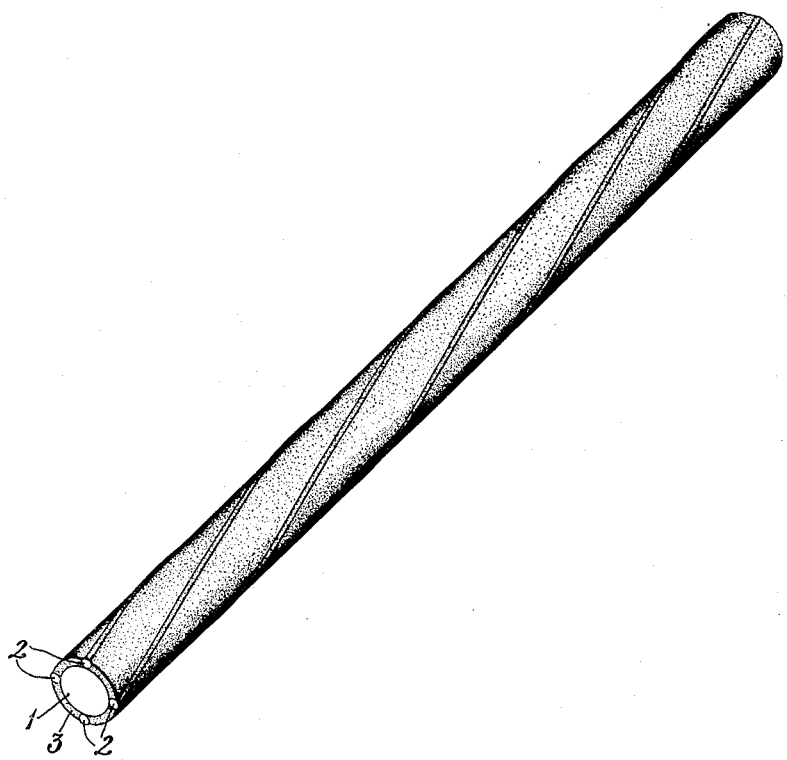
Inventor:
Joseph H. Humberstone,
by Harry E. Dunham.
His Attorney.

Patented Dec. 17, 1935

2,024,164

UNITED STATES PATENT OFFICE 2,024,164

ARC WELDING ELECTRODE

Joseph H. Humberstone, Schenectady, N. Y., assignor to General Electric Company, a corporation of New York Application October 26, 1934, Serial No. 750,095

5 Claims. (Cl. 219—8)

My invention relates to electrodes for use in metallic arc welding.

In metallic arc welding an arc is maintained between the work to be welded and a rod, wire or strip of metal, usually referred to as an electrode. During welding the electrode is fused or vaporized, or both, and the metal thereof deposited upon and welded to the work as the electrode is fed toward the work, either manually or automatically, so as to maintain the arc length substantially constant.

The quality of the metal deposited by such a process depends to a large extent upon the influence of certain elements or compounds associated with the electrode, usually in the form of a coating. Electrodes so coated are commonly designated as flux coated electrodes.

The flux is sometimes applied to the electrode as a heavy coating which during welding forms a mechanical shield for the weld metal transferred from the electrode to the work. Very often cellulosic material or other gas forming ingredients are also added to these heavy coatings to generate a gaseous shield about the arc and molten metal of the weld. During welding the heavy coating fuses and gathers as a slag upon the weld thereby shielding it from the action of the surrounding atmosphere. This slag coating also retards the cooling of the weld metal enabling occluded gases and slag to escape from the molten metal thereby avoiding porosity in the deposit. The slag covering also refines the physical structure of the weld.

For most welding operations a coating of uniform thickness must be applied to the electrode if the best operating characteristics of the electrode are to be obtained.

In order to provide a concentric coating of uniform thickness on the core of an electrode it has been proposed to apply thereto a single wrapping of asbestos or other suitable non-conducting material in open spirals about its core and then extrude the flux coating thereon. The spiral wrapping serves automatically to center the core in the extruding die and thus insures a concentric coating of uniform thickness on the electrode thus manufactured. At the same time this wrapping provides an anchorage for the flux by means of which it remains securely attached to the electrode during subsequent drying and handling operations.

It is an object of my invention to provide an electrode which is an improvement on the above referred to electrodes having a single wrapping.

One embodiment of my invention is illustrated in the accompanying drawing.

The end portion of the electrode illustrated in the drawing comprises a metallic core 1 provided with a plurality of spaced parallel helical windings 2 of like size and composition between which there is a coating 3 of substantially the same thickness as these windings. The windings 2 may be of cotton, paper, asbestos or any other cellulosic or mineral containing material, and the coating 3 may be of any suitable fluxing material which can be applied to the electrode in paste form. The core 1 may be of a suitable composition for depositing in the weld the desired metal or alloy. Alloying elements may be included in the flux coating, however.

The electrode is manufactured by feeding the core 1 through a winding head by means of which the windings 2 are applied to the core. It is to be noted that these windings engage the core throughout their length and that their turns all extend in the same direction. After the windings 2 have been applied to the core 1 the assembly is fed through an extruding machine by means of which the coating 3 is applied thereto. During this stage of the manufacturing process the windings 2 accurately center the core 1 in the extruding die or nozzle and insure the application of a concentric coating 3 of uniform thickness. The coated rod is then dried whereupon the flux coating shrinks slightly revealing by slight ridges the location of the windings 2. This is shown in the drawing.

By employing a plurality of spaced parallel windings the cross section of the electrode is rendered more uniform. When the windings are made of a gas producing material such as cotton or paper, gases are more uniformly generated about the arcing tip of the electrode. When the windings are made of a mineral substance such as asbestos, the fluxing ingredients are more uniformly distributed throughout the coating and the flux is thus rendered more suitable for its intended purpose. Furthermore, a plurality of windings provides a more effective anchorage for the flux applied to the rod than is obtained with a single winding.

The use of a plurality of spaced parallel windings also greatly facilitates the manufacture of heavy coated welding electrodes. By employing a plurality of spaced parallel windings the spinner, by means of which these windings are applied to the core of the rod, can travel at a lower rate of speed, or the wire can be run through the spinner and coating mechanism at a greater speed, while yet maintaining the same spacing between the windings, than is possible when employing a single winding. Furthermore, the number of times that the spinner must be loaded with spools of winding material is reduced when a plurality of windings are simultaneously applied to the core of the electrode. These factors all contribute to a greatly increased rate of production which is two or more times the speed of producing an electrode having a single winding. The speed of production depends, of course, on the number of windings applied increasing as the number of windings are increased. Because of the improved anchorage for the flux afforded by the use of a plurality of spaced parallel windings, long lengths of electrode material may be readily divided into shorter lengths without destroying the flux coating at the points of section.

The spacing of the parallel windings may be varied in accordance with the results desired, and the nature of the flux applied to the electrode. The windings should be spaced from one another at least an eighth of an inch. The greater the number of windings employed the greater will be the pitch of each winding. Preferably the windings should not have less than one turn to the inch, and may have less than one turn to the lineal foot of the electrode. The size of the windings will depend upon the thickness of the flux coating desired.

Various means may be employed for fabricating electrodes of my improved construction and the composition of the windings and flux coating may be varied to obtain the desired operating characteristics of the electrodes.

What I claim as new and desire to secure by Letters Patent of the United States, is:—

1. A welding electrode comprising a metallic core, a plurality of spaced parallel helical windings of like size and composition engaging said core throughout their length, and a coating of substantially the same thickness as said windings on said core in the spaces between said windings.

2. A welding electrode comprising a metallic core, a plurality of spaced parallel helical windings of like size and composition the turns of which extend in the same direction and engage said core throughout their length, and a coating of substantially the same thickness as said windings on said core in the spaces between said windings.

3. A welding electrode comprising a metallic core, a plurality of helical windings of like size and composition on said core the turns of which extend in the same direction and are spaced from one another at least an eighth of an inch, and a coating of substantially the same thickness as said windings on said core in the spaces between said windings.

4. A welding electrode comprising a metallic core, a plurality of helical windings of like size and composition engaging said core throughout their length, said windings having less than one turn to the inch and being spaced from one another at least one-eighth of an inch, and a coating of substantially the same thickness as said windings on said core in the spaces between said windings.

5. A welding electrode comprising a metallic core, a plurality of spaced parallel helical windings of like size of cellulosic material the turns of which extend in the same direction and engage said core throughout their length, and a flux coating of substantially the same thickness as said windings on said core in the spaces between said windings.

JOSEPH H. HUMBERSTONE.